March 11, 1930.  A. HUGUENIN  1,749,941
LUBRICATING DEVICE
Filed Sept. 20, 1928  3 Sheets-Sheet 1

INVENTOR.
Albert Huguenin.
BY
William C. Linton
ATTORNEY.

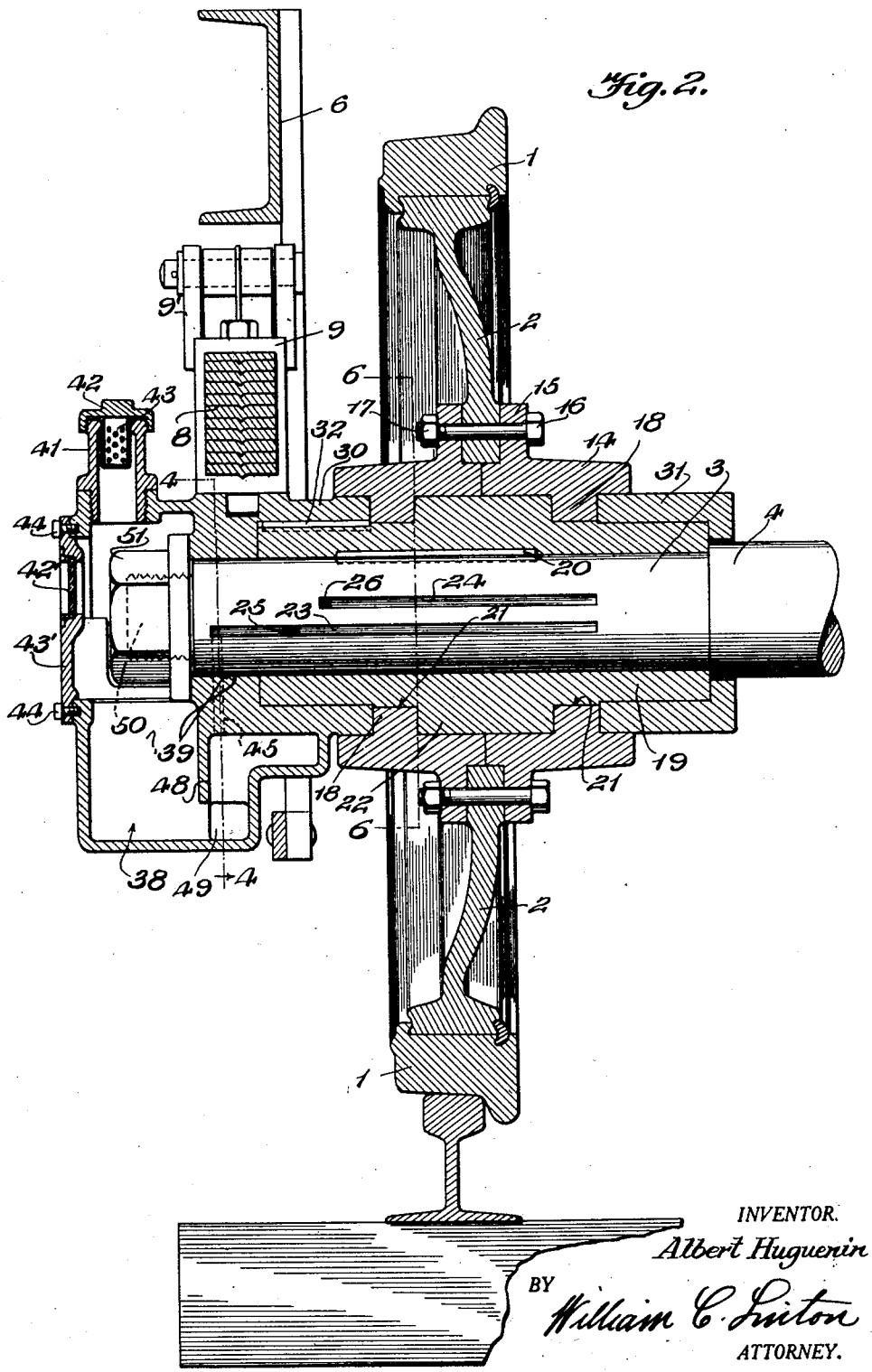

March 11, 1930.    A. HUGUENIN    1,749,941
LUBRICATING DEVICE
Filed Sept. 20, 1928    3 Sheets-Sheet 3
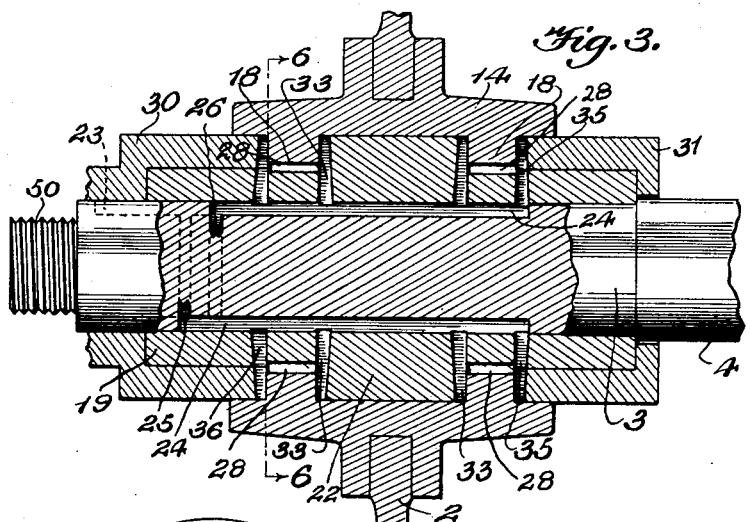
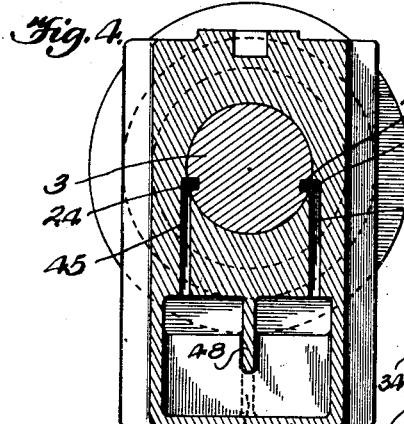
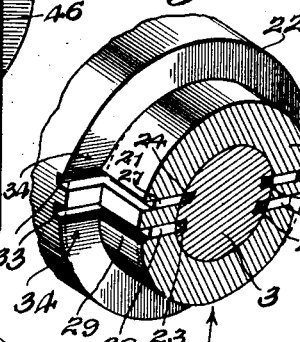
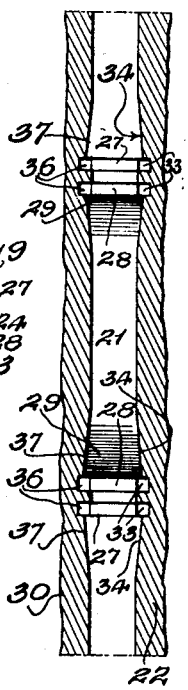
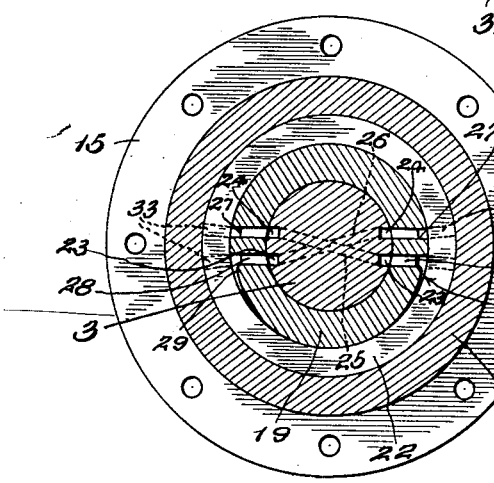
INVENTOR.
Albert Huguenin.
BY William C. Linton
ATTORNEY.

Patented Mar. 11, 1930

1,749,941

UNITED STATES PATENT OFFICE

ALBERT HUGUENIN, OF PARIS, FRANCE

LUBRICATING DEVICE

Application filed September 20, 1928. Serial No. 307,150.

This invention has reference to improvements in devices for lubricating rolling stock axles and wheels, having for an object to provide a device capable of being readily and effectually adapted to railway rolling stock axles and wheels of that construction or design now prevalent in the art with but comparatively slight modifications and whereby an even and uniform supply of lubricant will be directed onto the bearing surfaces thereof for reducing friction and wear to a minimum, with those incident advantages of economical maintenance, the device being so constructed as to effect a constant circulation of lubricant over the bearing surfaces and through the reservoir of the device, hence assuring the retention of the lubricant at a viscosity that will permit its practical usage for a materially prolonged period of time.

It is also among the salient features of the invention to provide a lubricating device of the character mentioned adapted to function for supplying a lubricating film to both thrust and vertical bearing surfaces of a particularly equipped railway rolling stock axle, portions of the bearing surfaces being constructed in a manner to cause a substantially pumping like action with respect to the lubricant whereby to positively bring about circulation of the same and to return the residue to the reservoir of the device.

It is also an object of the invention to provide the equipped railway rolling stock axle with means for delivering lubricant throughout the entire bearing length thereof, whereupon it will be distributed by action of the rotating bearing sleeve of the wheel in a uniform film thereover, the surplus lubricant being removed from the opposite or remote portion of the axle and returned through a duct to the source of supply, at which time it will be permitted to cool and to admix with the lubricant within the device reservoir for reusage.

Another equally important object of the invention may be stated to reside in the provision of a lubricant reservoir so arranged with respect to the equipped railway rolling stock wheel and axle as to be readily and conveniently accessible that lubricant may be supplied thereto, said reservoir having communication with the wheel and the axle bearing surfaces through ducts so disposed and so formed as to effect a continuous circulation of the lubricant.

Other objects of the invention will be in part obvious and in part pointed out hereinafter.

In order that the invention and its mode of operation may be readily understood by persons skilled in this particular art, I have in the accompanying illustrated drawings, and the detailed following description based thereupon, set out one possible embodiment of the invention.

In the accompanying drawings:

Figure 1 is an end elevation of the invention as applied to the wheel and axle of a railway rolling stock truck, Figure 2 is an enlarged vertical transverse section through the same, Figure 3 is a longitudinal section, in fragmentary detail, taken through the improved axle and wheel bearing sleeve, Figure 4 is a vertical fragmentary section taken on the line 4—4 of Figure 2, Figure 5 is a fragmentary detail in perspective illustrating the mounting of the wheel sleeve upon the axle and the formation and disposition of certain parts thereof.

Figure 6 is a transverse section taken on the line 6—6 of Figure 3, and,

Figure 7 is a semi-schematic view illustrating the formation of the thrust bearing portion of the wheel sleeve.

Figure 1:
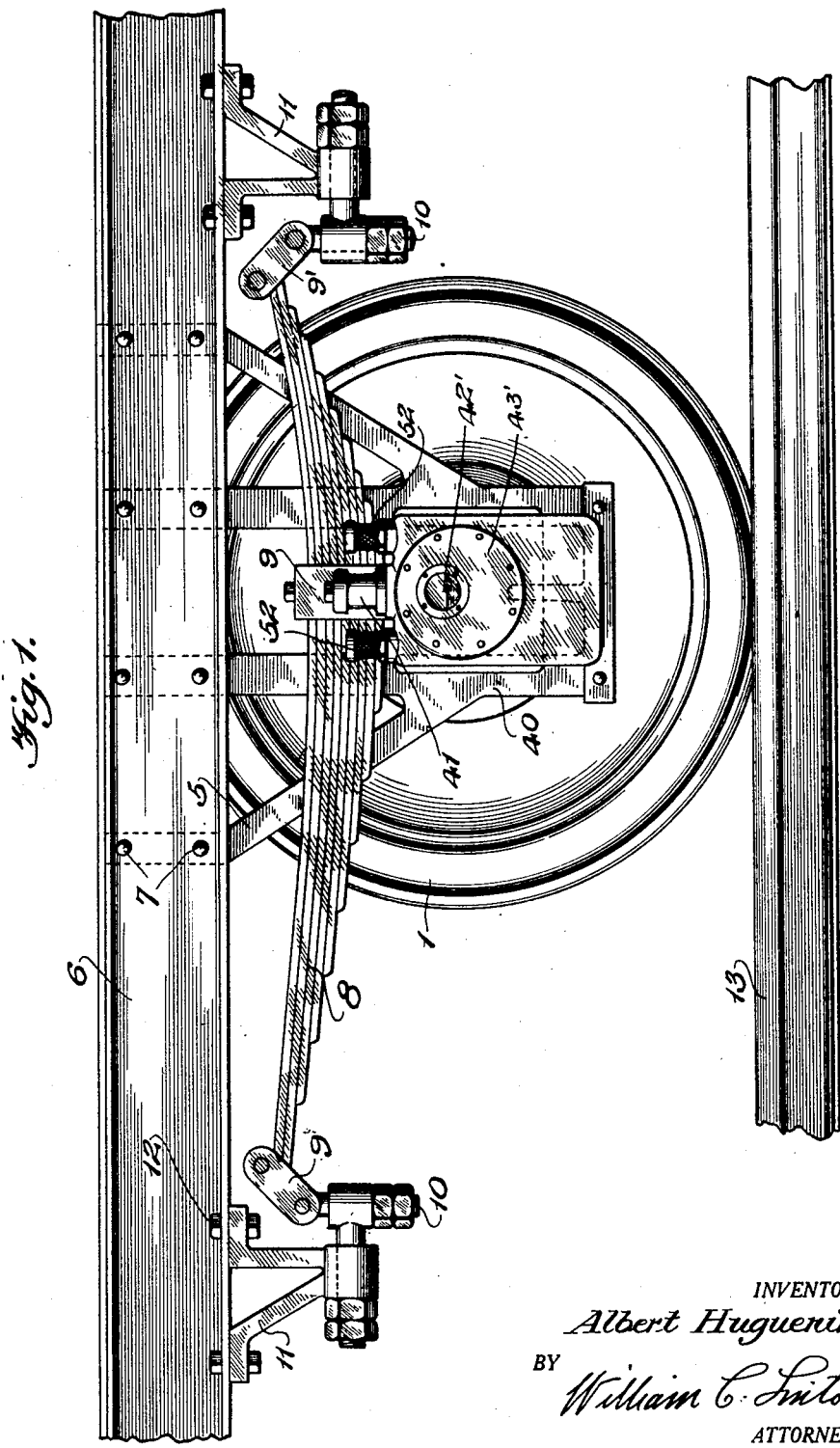

Having more particular reference to the drawings, in connection with which like characters of reference will designate corresponding parts throughout, it may be stated at this time that the improved railway rolling stock axle and wheel of the particular embodiment chosen for illustration of the invention, is of that general type, or species, now prevalent in this particular art, the wheel being indicated, generally, by the numeral 1 and comprehending a web portion adapted to have rotatable mounting upon a railway car truck axle 3, said axle having an enlarged shouldered portion, as at 4, and received through bearings provided therefor in the wheel and subsequently described more in detail, supporting brackets or arms 5 being rigidly secured to appropriate portions of the truck 6, as indicated by the numeral 7, while a semielliptical leaf spring 8 is engaged with said bearing means through the medium of a clamping device 9, the opposite ends of said spring being linked or otherwise connected through shackles 9' to adjustable mounting bolts 10, which in turn, are mounted upon brackets 11, bolted or otherwise secured to appropriate portions of the truck 6, as at 12; the wheel 1, as will be understood, being flanged about its tread portion whereby to facilitate its traversing a predetermined course, or track.

That matter constituting the invention, per se, and to be expressed hereinafter in detail, may be stated to consist of a meritorious adaptance of the railway rolling stock wheel 1 and the axle 3, a sectional or transversely divided bearing sleeve 14 being arranged concentrically of and through the wheel web portion 2, as is shown in the Figure 2, being rigidly connected thereto by the forming of annular or circumferentially disposed flanges 15 upon the meeting portions of the sectional bearing sleeve and between which, adjacent portions of the web 2, are arranged, whereupon connecting bolts 16 are passed through the flanges and adjacent portions of the wheel web and are then securely locked against relative movement by means of locking nuts 17 engaged with their respective screw threaded extremities; the inner or bearing surfaces of the sectional sleeve 14 being formed with annular thrust bearing portions or shoulders 18 which, as will be noted, are disposed at points slightly inwardly of the respective opposite or outer end portions of the sleeve sections.

Another bearing sleeve 19 is snugly engaged over the axle 3, aforesaid, abutting the shouldered portion 4 and being keyed as at 20, to said axle, this bearing sleeve 19 being provided with annular shouldered bearing portions 21 adapted to receive the thrust bearing portions 18 of the sleeve 14 thereupon, while intermediately of said shoulders 21, another annular bearing shoulder 22 is formed upon the sleeve 19 and, as shown in Figure 2, this particular shoulder is received between the relatively opposed annular shoulders 18, thus giving horizontal bearing or support as well as thrust bearing to the sleeve 14 connected to the wheel web 2.

Formed longitudinally of and extending throughout the major portion of the length of the axle 3 are pairs of substantially diametrically disposed ways or lubricant receiving and distributing grooves 23 and 24, the latter being of lengths less than their adjacent grooves 23, and each of these grooves 23 and 24 communicating with individual and relatively crossed ducts 25 and 26, the disposition of the ducts being such that the duct 25 communicates with one groove 23 and one groove 24, whereas the duct 26 communicates with the remaining grooves 23 and 24, the ducts being arranged to permit of this alternate groove communication, as is well shown in Figure 6, and hence permitting of the flow of lubricant from one to another.

Portions of the sleeve 19 adjacent to the grooves 23 and 24 are formed with longitudinally disposed slots 27 and 28, the arrangement and the length of the slots coinciding with the arrangement and the length of the grooves 23 and 24 so that with the flow of lubricant into the grooves, that lubricant will be allowed to flow to the registering slots 27 or 28 and thence outwardly and onto the outer peripheral or bearing surface of the sleeve 19. That the flow of lubricant from the slots 27 and 28 onto the bearing surfaces of the sleeve 19 may be effected in a manner to produce an even film over said bearing surface of the sleeve, I may and preferably do reduce portions of the peripheral surface of this sleeve 19 adjacent certain of the sides of the slots 28, hence, providing tapering ways 29 between portions of the sleeve 19 and portions of the inner peripheral or bearing surface of the sectional sleeve 14.

That a constant supply of lubricant to the thrust bearing portions 18 and 22 may be effected, and further that thrust or endwise bearing of the opposite end portions of the sectional bearing sleeve 14 may be provided for, I snugly and nonrotatably engage with the opposite extremities of the bearing sleeve 14, thrust sleeves 30 and 31, the sleeve 30 being keyed to a portion of the sleeve 19, as indicated by the numeral 32, whereas the sleeve 31, if desired, may be supplied with a similar connection.

As will be noted the inner marginal portions of the sleeves 30 and 31 have bearing engagement upon the adjacent side walls of the annular thrust or bearing shoulders 18 of the sleeve 14, and consequently upon this it will be understood that endwise or thrust movement of the sleeve 14, to any material degree, will be prevented. Furthermore, and as above stated, that lubricant may be supplied to the thrust bearings and contacting portions 18 and 22, and the extremities of the sleeves 30 and 31, I form upon the opposite side walls of the intermediate annular bearing shoulder 22, pairs of radially disposed and relatively diametrically arranged ways or ducts 33, and also, cut away portions of the adjacent walls of said shoulder 22, as is indicated in the Figure 7 by the numeral 34, providing thereby, inclined or rather tapered surfaces onto which lubricant from the communicating ducts 33 may flow and may thus, be caused to spread over the remaining areas of the particular side walls of the annular shoulder 22. Furthermore, that lubricant may be supplied to the outer side of that particular thrust bearing 18 adjacent the thrust sleeve 31, the inner end of said thrust sleeve 31 is provided with pairs of radially disposed and substantially diametrically arranged ducts 35 which, as will be noted upon reference to the Figure 3, communicate with or open onto the adjacent bearing surfaces of the last mentioned thrust bearing 18 and preferably, portions of the adjacent bearing surfaces of said sleeve 31 are cut away in a manner similar to the cutting away of the opposite side portions of the annular bearing 22, as indicated by the numeral 34, that such lubricant as may be discharged from the ducts 35 will be permitted to evenly distribute over and to form a lubricating film upon the adjacent and contacting portions of the sleeve 31 and the said thrust bearing 18.

The inner marginal portion of the thrust sleeve 30 is also provided with pairs of radially disposed and diametrically arranged ducts 36 adapted to be arranged adjacent the corresponding side walls of the remaining thrust bearing 18, so that with the flow of lubricant through said ducts 36 the same will be permitted to evenly distribute over the contacting or bearing surfaces of the sleeve 30 and the adjacent surface of the remaining thrust bearing 18. Likewise, portions of the inner extremity of the thrust sleeve 30 are cut away or tapered, as indicated by the numeral 37 adjacent or in proximity to the ducts 36, thereby allowing for the free flowing of lubricant from said ducts and onto and about the contacting surfaces of the sleeve 30 and the remaining thrust bearing 18.

In this connection, it is to be understood that the thrust sleeves 30 and 31 are nonrotatably mounted upon the sleeve 19 and also, that the ducts 33, 35 and 36 communicate with the oil the distributing grooves 23 and 24 and the slots 27 and 28. Consequently upon this, it will be seen that such lubricant as is delivered to the grooves 23 and 24, or rather a portion of the same, will be permitted to pass through said ducts 33, 35 and 36 onto the thrust bearing portions of the sleeves 18 and 19.

With a view to providing the invention with an oil supplying or reservoir means, a box-like receptacle 38 is formed integral with the outer portion of the thrust sleeve 30, having an annular bearing portion 39 provided therein adapted to be snugly received over the outer extremity of the nonrotatable axle 3, as indicated in the Figure 2; said reservoir being, as hereinbefore stated, fixedly supported with respect to the railway rolling stock truck through the medium of hanger or bracket arms 5 engaging at their free extremities with a hanger 40 disposed about the reservoir 38 and consequently upon this, effectually removing excessive or abnormal strains by reason of its weight upon the said axle 3. Also, it will be noted in this connection, that the reservoir 38 and a portion of the thrust sleeve 30 serve as a means for receiving the intermediate portion of the leaf spring 8 thereupon, permitting of its clamping or fixed connection thereto through the medium of the clamp 9, hereinbefore described; the opposite extremities of said spring 8 being connected, as herein before explained, to the truck 6. The reservoir 38 is adapted to be filled or partially filled with a suitable lubricant by way of a filling neck 41 provided upon the upper and outer portion thereof, normally closed through the medium of a cap 42 and the lubricant supplied to the reservoir being adapted to be passed through a strainer 43 for obvious reasons. Also, to permit of inspection of the condition and level of the lubricant within the reservoir 38, a sight window 42' is formed within a removable inspection plate 43', the latter being secured over an inspection opening formed in the outer wall of the reservoir 38 through the medium of locking screws or similar devices 44.

A pair of relatively opposed and vertically extending oil supply ducts 45 and 46 are formed in the inner wall of the reservoir 38, as is shown in the Figures 2 and 4, the lower extremities of these ducts opening into said reservoir, whereas the upper ends of the same communicate with the longer oil receiving and distributing grooves 23, as indicated by the numeral 47. Thus, it will be understood that with rotation of the wheel 1 and the bearing sleeve 14, lubricant will be drawn by reason of the partial suction created adjacent the contacting bearing surfaces of the sleeves 18 and 19 through the ducts 45 into the longer grooves 23 whereupon it will be distributed over the supporting bearing surfaces and thence through the ducts 33, 35 and 36 over the thrust bearing surfaces of the device.

To insure constant circulation of the lubricant through the reservoir 38 and the thorough admixing of the lubricant within such reservoir, a partition wall 48 is cast or otherwise fixedly arranged within the reservoir, the lower and inner part of the wall being ported as at 49, the lubricant circulating in and through said reservoir may pass from one compartment thereof to the other.

As is usual, the axle 3 is formed with a screw threaded extension 50 onto which a locking nut 15 is turned, said locking nut being accessible by removal of the cover or inspection plate 43' herein before described.

Also that air may be supplied to the reservoir, vents 52 are connected to the upper wall of the same, being of suitable perforate or foraminous formation whereby to admit an inflow of air of the necessary volume.

In operation of my improved lubricating device and assuming, of course, that the construction hereinbefore has been assembled, and therefore, that the parts of the same are in proper relative positions, with rotation of the wheel 1, lubricant will be drawn through the ducts 45 into the oil distributing grooves 23, through these grooves and through the slots 28 communicating therewith over onto the bearing surfaces of the sleeve 19 from whence it will be caused to flow in a film-like character downwardly and in the direction of rotation of the sleeve 14 onto the contacting or bearing surfaces, thereby effectually lubricating the same. Assuming that the sleeve 14 is rotating in a clockwise direction and referring in particular to the Figure 6, it will be seen that lubricant will be drawn upwardly through one of the ducts 46 and into that groove 23 to the right of said Figure 6, the lubricant flowing through the communicating slot 28 and through the tapered passageways 29 onto the contacting and bearing surfaces of the sleeves 14 and 19 and forming, thereby, a lubricating film over the lower and supporting or positively bearing portions of the said sleeves 14 and 19. Any surplus lubricant occurring after the bearing sleeve 14 passes the lowest center of load or stress will be discharged through the slot 28 in the bearing sleeve 19 communicating with the remaining or opposite groove 23, whereupon said lubricant will pass through the remaining duct 45 back into the opposite side of the reservoir 48 whereat it will be thoroughly admixed with the lubricant contained therein. Also, any further residue of oil adhering to the contacting or bearing surfaces of the sleeves 14 and 19 will be taken up through the slot 27 shown upon the left side of Figure 6, that lubricant flowing into the adjacent and communicating groove 24 through the duct 25 back to the intercommunicating groove 23 shown at the right side of the Figure 6, whereupon it will be redischarged onto the contact or bearing surfaces of the sleeves 14 and 19. Should the wheel 1 rotate in a counterclockwise direction, the mode of discharge of lubricant onto the bearing surfaces of the sleeves 14 and 19 will be reversed with respect to that action just explained in that lubricant would be drawn upwardly from the reservoir 38 through one of the ducts 45 into that oil distributing groove 23 shown at the left side of the Figure 6, whereupon it would overflow to the tapered passageway 29, the surplus being taken up by the opposite groove 23 and the residue being taken up by that groove 24 communicating with the slot 26 at the right side of the Figure 6 for return to said first mentioned groove 23 and redischarged by way of the slot 28 on the bearing surfaces of the sleeves 14 and 19.

It will be furthermore understood that simultaneously with the discharge of lubricant from the slots 27 and 28 onto the bearing surfaces of the sleeves 14 and 19, a portion of said lubricant will be caused to flow through the ducts 33, 35 and 36 onto the contacting thrust bearing portions hereinbefore described, thereby forming a lubricating film over the same and consequently, reducing friction to minimum.

From the foregoing, it will be understood that a continuous circulation of lubricant will be effected through the reservoir 38, the outgoing lubricant discharging onto the bearing surfaces and thrust bearings of the sleeves 14 and 19 and returning to said reservoir for thorough admixture with the body of lubricant contained therein that the viscosity of such lubricant may be maintained and thus, that the period of practical usage of the lubricant will be materially prolonged.

I claim:

1. In combination, an axle and a wheel, a lubricant reservoir, inter-communicating grooves longitudinally of the axle in substantially diametrically opposed relation, said reservoir having ducts leading from the same and communicating with the grooves, a bearing sleeve for the wheel, and means associated with portions of said sleeve operable with rotation of the sleeve for causing lubricant to be drawn from the reservoir through certain of said ducts into and from the groove communicating therewith and returning the residue thereof through the remaining groove and duct into the reservoir.

2. In combination, an axle and a wheel, a lubricant reservoir, said axle having inter-communicating grooves formed longitudinally of the same in substantially diametrically opposed relation, the reservoir having ducts leading from the same and communicating with said grooves, a bearing sleeve for the wheel, and means operable with rotation of said bearing sleeve for effecting a pumping like action of lubricant from the reservoir through certain of said ducts into and from the groove communicating therewith and returning the residue thereof through the remaining groove and duct into the reservoir.

3. In combination, an axle and a wheel, a lubricant reservoir, said axle having inter-communicating pairs of grooves formed longitudinally of the same in substantially diametrically opposed relation, the reservoir having ducts leading from the opposite sides of the same and communicating with certain of said pairs of grooves, a bearing sleeve for the wheel, and means associated with portions of said sleeve operable with rotation of the sleeve for causing lubricant to be drawn from the reservoir through certain of said ducts into and from that groove communicating therewith and returning the residue thereof through one of the remaining grooves and the remaining duct into the reservoir.

4. In combination, an axle and a wheel, a lubricant reservoir, relatively intercommunicating grooves formed longitudinally of the axle periphery in substantially opposed relation, said reservoir having ducts leading from the opposite sides of the same and communicating with certain of said grooves, a bearing sleeve for the wheel, and means operable with rotation of said bearing sleeve for effecting a pumping-like action of lubricant from the reservoir through certain of said ducts into and from that groove communicating therewith and returning the surplus lubricant to the remaining groove communicating with the remaining duct into the reservoir.

5. In combination, an axle and a wheel, a lubricant reservoir, said axle being formed with longitudinally disposed inter-communicating grooves arranged in substantially diametrically opposed relation, said reservoir having ducts leading from the opposite sides of the same and communicating, individually, with the grooves, a bearing sleeve for the wheel, a second bearing sleeve fixedly mounted upon said axle having slots therein communicating with and corresponding to said grooves, thrust bearing means on each of said sleeves inter-engaging with each other, and means on the opposite side portions of the axle bearing sleeve thrust bearing means co-operable with the adjacent sides of the thrust bearing portions of the wheel bearing sleeve whereby with rotation of the wheel bearing sleeve to effect the drawing of lubricant from the reservoir through certain of said ducts into and from that groove communicating therewith and discharging the lubricant onto contacting surfaces of said bearing sleeves, then returning the residue of said lubricant through the remaining slots and grooves into the remaining duct and then into the reservoir.

6. In combination, an axle and a wheel, a lubricant reservoir, said axle being formed with pairs of longitudinally disposed grooves arranged in substantially diametrically opposed relation, certain of said grooves communicating with certain of the grooves of the diametrically opposite pair, said reservoir having ducts leading from the same and communicating with others of the grooves, a bearing sleeve for the wheel, a bearing sleeve fixedly mounted upon the axle having slots therein communicating with and corresponding to said pairs of diametrically opposed grooves, and means on portions of said sleeves co-acting with rotation of the wheel bearing sleeve for drawing lubricant from the reservoir through certain of said ducts into and from that groove communicating therewith and returning the residue thereof through the remaining groove and duct communicating with the same into the reservoir.

7. In combination, an axle and a wheel, a lubricant reservoir, said axle having pairs of inter-communicating grooves formed longitudinally of the same in substantially diametrically opposed relation, said reservoir having ducts leading from the same and communicating with certain of said grooves, a bearing sleeve for the wheel having thrust bearing portions, bearing sleeves fixedly mounted upon said axle and contacting with said wheel bearing sleeve having thrust bearings upon the same, the thrust bearing portions of said wheel and axle bearing sleeves having radially disposed ducts formed therein and communicating with certain of said grooves, and means on portions of said wheels and axle bearing sleeve co-acting with rotation of the former, for drawing lubricant from the reservoir through certain of said reservoir ducts into and from those grooves communicating with the same and from the ducts of said thrust bearing portion and returning the residue through the remaining groove and reservoir ducts into the reservoir.

8. In combination, an axle and a wheel, the peripheral portion of the axle having inter-communicating grooves formed thereupon, a lubricant reservoir adjacent the axle having communication with said grooves, a wheel bearing sleeve, and means adjacent the wheel bearing sleeve partially rotatable therewith for causing lubricant to be drawn from the reservoir, circulated through the grooves and the residue returned to said reservoir.

9. In combination, an axle and a wheel, the peripheral portion of said axle having longitudinally disposed grooves formed therein, a lubricant reservoir adjacent the axle having communication with said grooves, an axle bearing sleeve fixedly mounted upon the axle, a wheel bearing sleeve fixedly carried by the bearing portion of the wheel, and cooperable means carried upon adjacent portions of said axle and bearing sleeves operable with rotation of the wheel bearing sleeve for causing lubricant to be drawn from the reservoir, circulated through the grooves and the residue returned to said reservoir.

ALBERT HUGUENIN.